R. E. GREGG.
STEERING MECHANISM.
APPLICATION FILED JAN. 2, 1912.
1,050,060.
Patented Jan. 7, 1913.
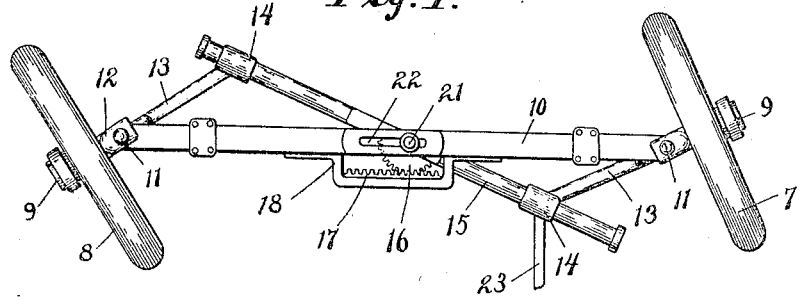
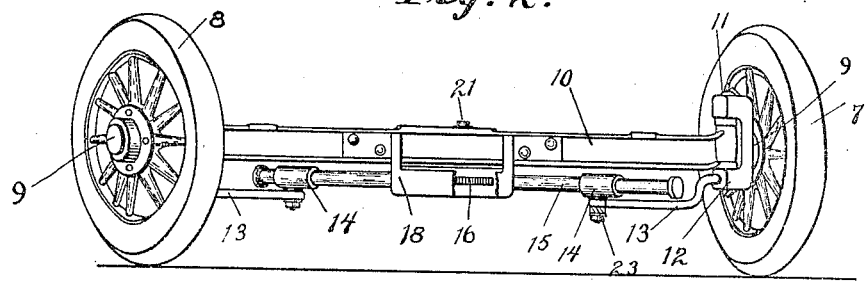
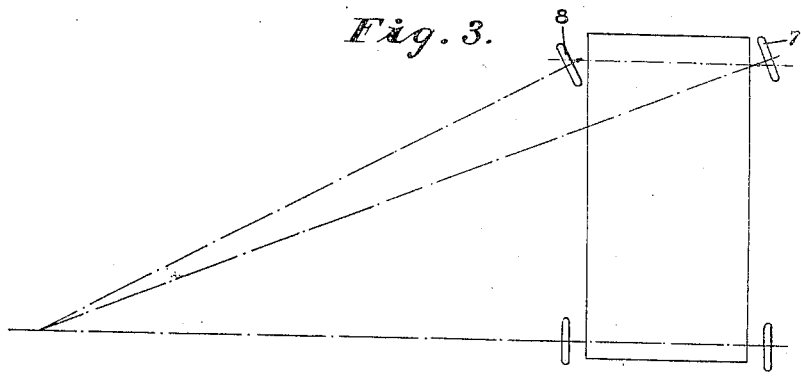
Witnesses
Karl R. Clendening.
S. J. Carter
Inventor
Robert E. Gregg.
By Arthur M. Howe
Attorney

UNITED STATES PATENT OFFICE.

ROBERT E. GREGG, OF INDIANAPOLIS, INDIANA, ASSIGNOR TO GENERAL SPECIALTY COMPANY, OF INDIANAPOLIS, INDIANA, A CORPORATION OF INDIANA.

STEERING MECHANISM.

1,050,060.  Specification of Letters Patent. Patented Jan. 7, 1913.

Application filed January 2, 1912. Serial No. 669,078.

*To all whom it may concern:*

Be it known that I, ROBERT E. GREGG, a citizen of the United States, residing at Indianapolis, in the county of Marion and State of Indiana, have invented a new and useful Steering Mechanism, of which the following is a specification.

It is the object of my invention to provide a steering mechanism for vehicles, especially automobiles, which will cause all the wheels of the vehicle, when the latter is turning, to move in concentric circles. To this end, I have provided mechanism which has a number of novel features, which will appear from the description and drawings and will be particularly pointed out in the claims.

In the drawing which illustrates a preferred embodiment of my invention, Figure 1 is a plan view of a steering axle provided with my invention; Fig. 2 a rear elevation of such steering axle; and Fig. 3 a diagrammatic view showing how all the wheels of the automobile describe curves having a common center.

The two steering wheels 7 and 8 are mounted in any suitable manner on the two ends of the front axle 10 of the vehicle. As shown, each wheel is mounted on a stub shaft 9 forked at its inner end to span the end of the axle 10, the fork and axle end being pivoted together on a vertical axis, as by a pivot pin 11. From one prong of the fork 12 of each stub shaft 9 projects an arm 13, this arm preferably being directly opposite the stub shaft. To the projecting end of each arm 13 is pivoted a collar 14, which fits on and is slidable longitudinally of one end of a rocker arm 15. This rocker arm moves about a shifting pivot or fulcrum, the shifting of which is such that the axes of the wheels 7 and 8 will always meet on, or substantially on, the axis of the rear wheels of the vehicle. One way of obtaining this shifting is shown in the drawings. Here the rocker arm 15 is provided at its center with a gear segment 16, which meshes with a rack 17 suitably supported on the axle 10; as shown, this rack is fixed on a frame 18 attached to the axle 10. For convenience in manufacture, the gear segment 16 is preferably a segment of a circular gear, and the rack 17 is preferably a straight rack, as approximately correct results are obtained thereby; but these features may be varied as required. A pin 21 in the rocker arm 15, preferably located at the center of the gear segment 16 if the latter is circular, projects into one or more slots 22 either in the axle 10 or in some part fixed relatively thereto. As shown, the pin 21 extends into vertically registering slots in the axle proper and the underhanging part of the frame 18. The slots 22 are straight, extending longitudinally of the axle 10, if the gear segment 16 is circular and the rack 17 is straight; in any case, the slots 22 are so shaped that they will maintain the gear segment 16 and rack 17 in proper meshing engagement.

One of the arms 13 or the rocker arm 15 is suitably connected, by a link 23, to the steering mechanism, which may be of any desired type. As shown, the link 23 is connected to the right-hand arm 13 at the pivotal point of the collar 14. By operating the steering mechanism, the link 23 is moved backward or forward, turning the arm 13 and stub shaft 9 to which it is connected around their vertical pivot. This rocks the rocker arm 15 so that the gear segment 16 rolls along the rack 17, and the movement of the rocker arm 15 moves the other arm 13 and stub shaft 9. Because of the rolling of the gear segment 16 on the rack 17, the turning center of the rocker arm 15 constantly shifts as said arm is rocked, so that points along the rocker arm 15 describe roulette or cycloidal curves. The distances between the momentary center of rotation and points on opposite sides of the middle point of the rocker arm 15 vary inversely. The collars 14 slide along the rocker arm 15 as the latter is turned, but on account of the rolling above referred to, they slide at different speeds, the one which is moving to the rear moving more slowly than does the one which is moving forward. As a result, the guiding wheel 8, which is connected to the forward moving collar 14 in Fig. 1, is turned to a greater angle than is the wheel 7, which is connected to the backward moving collar 14; so that the axes of the two wheels 7 and 8 meet. By a proper proportioning of the various parts, their meeting point is always on the line of the rear axle of the vehicle, as illustrated diagrammatically in Fig. 3. In consequence, the four wheels of the vehicle move in concentric circles.

My invention is capable of considerable modification, and I aim to cover all modifications which do not involve a departure from the spirit and scope of my invention.

What I claim is:

1. A vehicle steering mechanism comprising two vehicle wheels mounted on separate pivoted shafts, and a rocker arm connecting said two shafts, said rocker arm being mounted so that it rolls on its support.

2. In combination, an axle, two wheel-bearing stub shafts pivoted to said axle at opposite ends thereof, and a rocker arm connecting said two stub shafts and having a rolling engagement with the axle.

3. In combination, a vehicle axle, wheel-bearing shafts pivotally mounted at opposite ends of said axle and provided with arms, and a rocker arm mounted on said axle and connected to said arms, said rocker arm turning about a center which shifts relatively to the rocker arm.

4. In combination, a vehicle axle, wheel-bearing shafts pivotally mounted on opposite ends of said axle and provided with arms, and a rocker arm mounted on said axle and having a shifting center, said rocker arm having a sliding connection with each of the arms on said shafts.

5. In combination, a vehicle axle, wheel-bearing shafts pivotally mounted on opposite ends of said axle and provided with arms, a rocker arm carried by the axle and mounted thereon so that points on the rocker arm have cycloidal movements, said rocker arm being connected to the two arms on said shaft.

6. In combination, a vehicle axle, wheel-bearing shafts pivoted to said axle at opposite ends thereof and provided with arms, a rocker arm the opposite ends of which have a sliding connection with the aforesaid arms, said rocker arm being mounted on said axle by a rack and pinion mounting.

7. In combination, a vehicle axle, wheel-bearing shafts pivotally mounted on said axle at opposite ends thereof, and a rocker arm slidingly connected to both of said shafts, said rocker arm being mounted so that when moved any point thereof describes a roulette curve.

8. In combination, a pair of vehicle wheels, each having an independent vertical pivoted support, an operating arm carried by each wheel support, a swinging arm having a fulcrum shiftable relatively to the swinging arm, and intermediate connections between said wheel support operating arm and said swinging arm.

In witness whereof, I, have hereunto set my hand and seal at Indianapolis, Indiana, this 22nd day of December, A. D. one thousand nine hundred and eleven.

ROBERT E. GREGG. [L. S.]

Witnesses:
G. B. SCHLEY,
FRANK A. FAHLE.